April 10, 1928.
R. D. EVANS
1,665,917
REGULATOR SYSTEM
Filed April 12, 1921        2 Sheets-Sheet 2
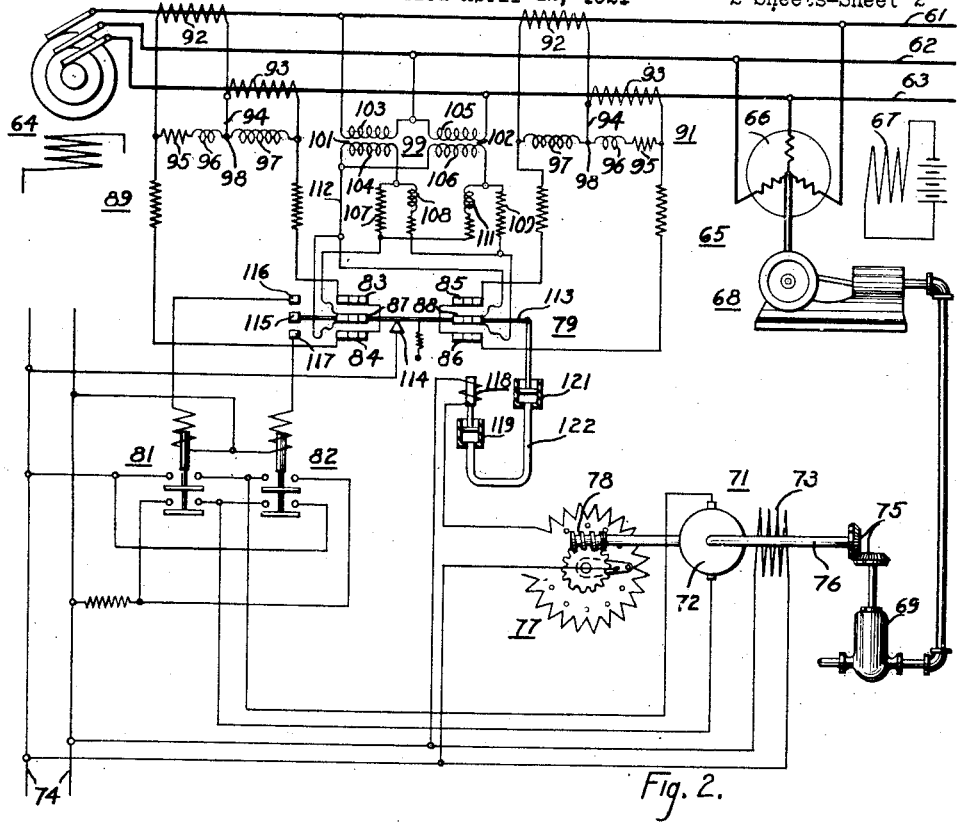
Fig. 2.
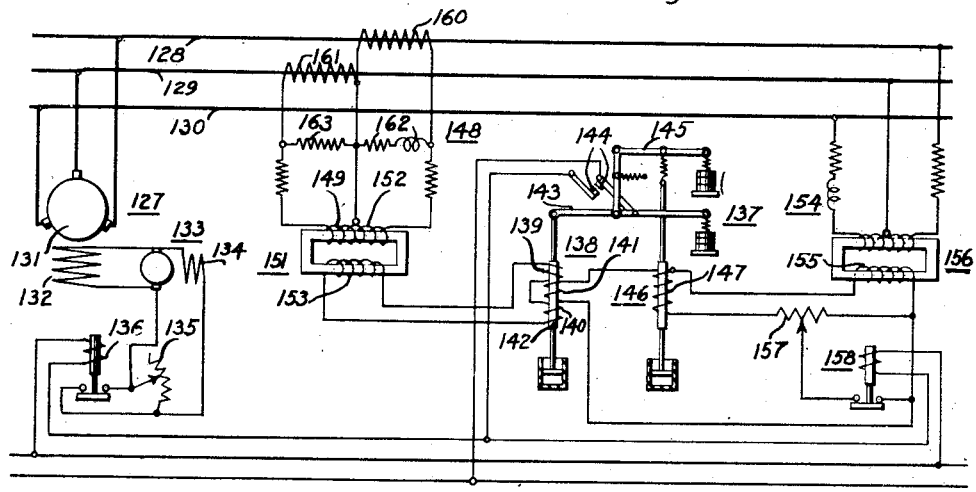
Fig. 3.
Fig. 4.
WITNESSES:
John W. Whiting
M. Theodore Simmons
INVENTOR
Robert D. Evans.
BY
Wesley G. Carr
ATTORNEY Patented Apr. 10, 1928.

1,665,917

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed April 12, 1921. Serial No. 460,781.

My invention relates to regulator systems and has special relation to regulator systems which will accurately function on either a balanced or an unbalanced electrical system.

One objection of my invention is to provide means whereby the regulator may be controlled in accordance with the symmetrical components of the unbalanced polyphase quantities of the system to which it is connected.

Another object of my invention is to provide a static system whereby regulator apparatus of well-known constructions may be operated to perform their usual functions in accordance with such symmetrical components.

In the present systems of regulation, the effective regulation and the machine excitation are dependent upon the particular phase to which the potential transformer is connected.. The present invention adapts the regulating apparatus to be accurately operative, independent of any phase connection, and, thus, to regulate the controlled device in accordance with the best balanced conditions of the polyphase circuit to which the regulator is connected. Or, stated another way, the regulator systems of the present application accurately function, irrespective of load conditions.

In a copending application of Charles Le G. Fortescue, Lewis W. Chubb and Joseph Slepian. Serial No. 358,373, filed Feb. 13, 1920, and assigned to the Westinghouse Electric Manufacturing Company, is disclosed the broad principle of indicating the symmetrical components of the unbalanced quantities of an electrical system. This application also sets forth the fact that some means must be employed to indicate the charge to be imposed on a consumer for current used as a single-phase load, for the reason that it is well known that, when a polyphase circuit becomes unbalanced, the capacities of the generator and the feeder circuit are reduced.

Since it has been discovered that measuring instruments which indicate correctly on a balanced system do not indicate correctly on an unbalanced system, it follows that regulating apparatus which has heretofore been constructed to regulate in accordance with the electrical conditions of a balanced system will not regulate to the best advantage on an unbalanced polyphase system.

It has also been discovered that any unbalanced polyphase system of electrical quantities may be resolved into two or more balanced or symmetrical systems. In a three-phase, three-wire system, such as is illustrated in the accompanying drawings, these quantities may be termed the zero, the positive and the negative or counter rotational components. In other words, the voltage, the current or any other electrical quantity of a three-phase unbalanced circuit may be resolved into a zero-phase-sequence component, a positive-phase-sequence component and a negative-phase-sequence component. In a three-phase system, the zero-phase sequence component is zero on either a balanced or unbalanced system.

In other words, since it is desirable to measure the current consumed in accordance with the symmetrical components of an unbalanced electrical system, it likewise becomes desirable to regulate the electrical system in accordance with the same symmetrical components.

The herein described invention is illustrated as applied to a three-phase electrical system, but it will be understood that the principles are equally applicable to other polyphase systems. It should also be borne in mind that the herein described regulator apparatus will be unaffected in its normal operation whenever the circuit to which it is connected becomes balanced; and, in addition, the particular connections specified herein permit the regulators to accurately maintain their normal operations whenever the circuit becomes unbalanced.

Various methods have been proposed for indicating the symmetrical components of electrical systems in commercial apparatus, so that regulating devices may be controlled in accordance therewith. Some of these methods are indicated in the accompanying drawings, wherein Figure 1 is a diagrammatic illustration of circuits and apparatus embodying the present invention, as applied to the control of an induction-regulator unit;

Fig. 2 is a diagrammatic illustration of circuits and apparatus embodying the present invention, as applied to a load regulator;

Fig. 3 is a diagrammatic illustration of circuits and apparatus embodying my invention, as applied to a power-factor regulator, and Fig. 4 is an enlarged detail view of the main control magnet of the power-factor regulator.

Figure 1:
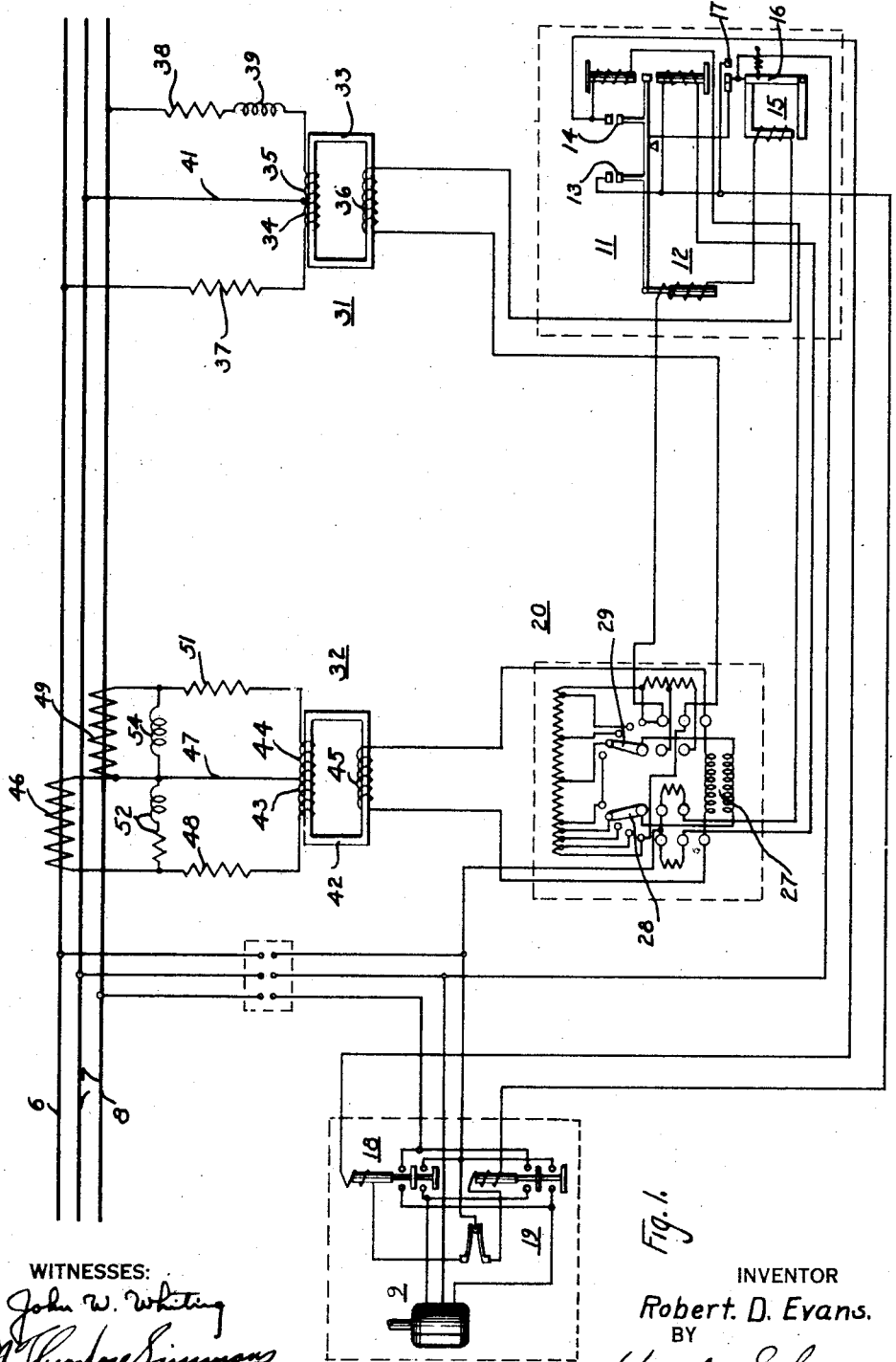

Referring to Fig. 1, a control system for an induction regulator, of well-known construction, is diagrammatically illustrated as governed in accordance with the positive-phase-sequence components of the unbalanced electrical quantities of the supply circuit comprising conductors 6, 7 and 8. The induction regulator (not shown) is controlled by the operation of the motor 9, which, in turn, is governed by a contact-making voltmeter 11, in accordance with variations in the voltage of the supply circuit, so as to cause the induction regulator to maintain the voltage of said circuit substantially constant.

To this end, the voltmeter comprises a main actuating magnet 12, which is energized in accordance with the positive-phase-sequence component of the unbalanced voltages of the supply circuit through apparatus 31, hereinafter described. The contact-making arm of the voltmeter 11 carries one contact member of each of two sets of contact members 13 and 14. Connected in series-circuit relation with the coil of the main actuating magnet 12 is the coil of an electromagnet 15, having a co-operating armature 16, which carries one of a set of contact members 17.

The operation of the contact-making voltmeter 11 controls the operation of electromagnetic switches 18 and 19. When the switch 19 is operated, the motor 9 is rotated in such direction as to move the induction regulator to a position in which it will boost or raise the voltage impressed upon the supply circuit. On the other hand, when the switch 18 is operated, the motor 9 will rotate to move the induction regulator into a position to lower the voltage of the supply circuit.

Since the control circuits and apparatus, considered alone, constitute no part of the present invention, and since their operation is well known, no further detailed reference thereto will be made herein. Patents Nos. 1,303,337, May 13, 1919 and 1,326,355, Dec. 30, 1919, to Edwin E. Lehr, provide complete descriptions of these subjects.

Interposed in circuit with the coil of the main control magnet 12 is a compensating apparatus 20, also of well-known construction, which is adapted to automatically increase the voltage as the load increases and to take care of the increasing impedance or IZ drop in the supply circuit, so that the induction regulator will operate to maintain a constant supply-circuit voltage at the center of distribution. The compensating device 20 comprises a transformer 27, the opposite terminals of the secondary winding of which are respectively connected to the rheostat arms 28 and 29, and have impressed thereupon a voltage directly proportional to one symmetrical component of the unbalanced voltages of the polyphase system by reason of the connection of the secondary winding 27 to instrument 31. The primary winding of the transformer 27 is supplied with a phase-sequence component of the unbalanced currents of the polyphase system, similar to the voltage component indicated by the instrument 31, through the agency of the instrument 32, hereinafter described. The compensating device 20 and the primary relay 11 are of well-known construction, and cooperate in the usual way, the usual voltage transformer leads being connected to the coil 36, and the usual current-transformer leads being connected to the coil 45. The operation of the compensating device 20 is also well known, and, for this reason, no detailed description thereof will be made in the present application.

The instrument 31, for acquiring the symmetrical phase-sequence component of the unbalanced voltages of the supply circuit, comprises a transformer having a core member 33, two primary windings 34 and 35, and a secondary winding 36. One terminal of the primary winding 34 is connected to supply conductor 6, through a resistor 37. One terminal of the primary winding 35 is connected to supply conductor 8, through a resistor 38 and a reactor 39. The two windings are connected in opposition to each other and the common terminal thereof is connected to supply conductor 7, by means of a conductor 41. The resistor 37 is of such high resistance that the current traversing the winding 34 is in phase with the voltage across the conductors 6 and 7. The impedance of the resistor 38 and the reactor 39 is of such value that the current traversing the winding 35 lags 60° behind the voltage across the conductors 7 and 8.

The secondary winding 36 of the instrument 31 is connected in series-circuit relation with the coils of the electromagnets 12 and 15 and to the voltage terminals of the compensator 20.

With this arrangement, magnetic flux is induced in the core member 33 to thereby cause current to traverse the secondary winding 36 when a balanced polyphase voltage of predetermined phase sequence exists on the supply circuit. Also, the resistor 37 is so designed and the impedance of the circuit comprising the resistor 38 and the reactor 39 is such that no magnetic flux interlinks with the secondary-winding circuit when a balanced polyphase voltage of other phase sequence is applied to the circuit. In other words, in a three-phase system, the unbalanced voltages may be resolved into a balanced voltage of a positive, or direct-rotational, component, and a balanced voltage of a negative, or counter-rotational, component.

Hence, in the present illustration, the resulting flux interlinking the winding 36, and, consequently, the current traversing this winding, are proportional to the positive, or direct-rotational, balanced component of the unbalanced voltages existing upon the supply circuit. On the other hand, the negative component will not be indicated by apparatus 31, and, hence, the regulator will not be affected thereby.

Should it be desired to have the instrument 31 indicate the counter-rotational or negative-phase-sequence component of the unbalanced voltages of the supply circuit, it would only be necessary to so change the connections of the transformer windings 34 and 35 that conductor 41 would be connected to the supply conductor 8, and the circuit comprising the resistor 38 and the reactor 39 would be connected to the supply conductor 7. The instrument 31 would then supply a current which would be proportional to the counter-rotational component of the unbalanced voltage of the supply circuit.

The instrument 32, for indicating the positive-phase-sequence component of the unbalanced currents of the supply circuit, comprises a transformer having a core member 42, two primary windings 43 and 44, and a secondary winding 45. A series transformer 46, associated with supply conductor 6, is connected, through a conductor 47, to the common terminal of the primary windings 43 and 44, and, through a register 48, to the other terminal of the winding 43. In a similar manner, a series transformer 49, associated with supply conductor 8, is connected, through the conductor 47, to the common terminals of the windings 43 and 44 and, through a resistor 51, to the other terminal of the winding 44.

A combined resistor and reactor, or reactive impedance device 52, is connected across the secondary terminals of the transformer 46, and a reactor 54 is connected across the secondary terminals of the transformer 49. With this arrangement, the impedance device 52 has a voltage impressed thereacross which is proportional to the current traversing the conductor 6, and the resistor 53 and reactor 54 have a voltage impressed thereacross which is proportional to the current traversing the conductor 8. The impedance device 52 and the reactance device 54 are adapted to shift the phase angular relations of the currents 30° and 90°, respectively.

Thus, as set forth above with respect to the instrument 31, the current traversing the winding 44 will be 60° out of phase with the current traversing the winding 43, and winding 45 will supply a current in accordance with the positive-phase-sequence component of the current traversing the supply circuit.

If it should be desired to have the instrument 32 supply a current in accordance with the negative, or counter-rotational, component of the current traversing the supply circuit, it would only be necessary to locate the secondary winding of the series transformer 49 upon the supply conductor 7, rather than upon the supply conductor 8, as indicated in Fig. 1. Or, if desired, the impedance devices 52 and 54 could be interchanged.

From the foregoing statements, it will be apparent that the induction regulator may be operated in accordance with the symmetrical phase-sequence components of the unbalanced electrical quantities of the supply circuit, which are similar to those for which the consumer may be charged.

Fig. 2 exemplifies a load-regulating system wherein it is proposed to energize the control element of the regulator in accordance with the positive and the negative phase-sequence components of the currents and of the voltages of the unbalanced system.

In brief, this system comprises a main source of supply and an auxiliary source of supply, a means for controlling the auxiliary source of supply in accordance with the load demand upon the supply circuits and a Kelvin-balance-controlled regulating apparatus. The system is also provided with reactive means for preventing a hunting action by the regulator.

The arrangement of Fig. 2 contemplates the adaption of the principles of the present invention to the above-mentioned load regulator in order that it may more accurately function on an unbalanced supply circuit.

A supply circuit, comprising conductors 61, 62 and 63, is provided with a main source of supply, comprising a generator 64, and an auxiliary source of supply, comprising a generator 65 having a rotor 66 and a stator 67. The auxiliary generator 65 is provided with a suitable prime mover, such as the illustrated steam-engine 68, which is adapted to be controlled by means of a throttle valve 69.

The throttle valve 69 is operated, through bevel gears 75, by pilot motor 71, which has an armature 72 and a field-magnet winding 73 energized from auxiliary supply conductors 74. The shaft 76 of the pilot motor also controls the operation of an adjustable rheostat 77, through the illustrated worm-gear mechanism 78, for a purpose to be hereinafter described. The operation of the pilot motor 71 is goverened by the operation of a Kelvin balance 79 and two electromagnetic switches 81 and 82. The Kelvin balance comprises four stationary coils 83, 84, 85 and 86, and two movable coils 87 and 88.

Stationary coils 83 and 84 are adapted to be energized in accordance with the positive phase-sequence component of the unbalanced currents of the supply circuit through apparatus 89, while stationary coils 85 and 86 are adapted to be energized in accordance with the negative phase-sequence component of the unbalanced currents of the supply circuit, through apparatus 91. The movable coils 87 and 88 are respectively energized in accordance with the above-mentioned components of the voltages of the supply circuit, through apparatus 99.

The apparatus for indicating the balanced positive-phase-sequence component of the unbalanced current comprises series transformers 92 and 93, which are associated with supply conductors 61 and 63, respectively, and are each connected, by one terminal, to a conductor 94. Connected in series relation across the secondary winding of the transformer 92 are a resistor 95 and a reactor 96; and, connected across the secondary winding of the transformer 93, is a reactor 97, which is also in series relation with resistor 95 and reactor 96. The conductor 94 is connected to a point 98 between the reactor 97 and the combined impedance 95 and 96. The arrangement of the reactive impedance and reactance devices is immaterial so long as they produce an angular phase relation of 60° with the currents of the supply circuit. Therefore, stationary coils 83 and 84 are energized proportional to the positive-phase-sequence component of the unbalanced currents.

Inasmuch as the apparatus 91 is identical with the above-described apparatus 89, with the exception that the resistor-reactor 95—96 is connected across the terminals of the transformer 93 and the reactor 97 is connected across the transformer 92, the same reference characters used in the description of the apparatus 89 will be applied to apparatus 91. By reversing the relations of the two impedance devices, the stationary coils 85 and 86 will be supplied with a current proportional to the negative-phase-sequence component of the unbalanced currents of the supply circuit.

Thus, one side of the Kelvin balance is supplied with current proportional to the balanced positive-phase-sequence component of the unbalanced currents, while the opposite side of the Kelvin balance is supplied with current proportional to the balanced negative-phase-sequence component of the unbalanced currents.

The movable or voltage coils 87 and 88 are respectively adapted to be energized in accordance with the symmetrical components of the unbalanced voltages of the supply circuit, corresponding to the current component of the associated current coils. That is, movable coil 87 has impressed thereupon a voltage which is proportional to the positive-phase-sequence component of the unbalanced voltage, and movable coil 88 has impressed thereupon a voltage proportional to the negative-phase-sequence component of the unbalanced voltage, through their respective connections with the apparatus 99, which comprises two transformers 101 and 102.

Transformer 101 comprises primary winding 103 and secondary winding 104, and transformer 102 comprises primary winding 105 and secondary winding 106. One terminal of the secondary winding 104 is connected to a resistor 107 and an inductive impedance device 108. One terminal of the secondary winding 106 is connected to a resistor 109 and an inductive impedance device 111. The opposite terminals of secondary windings 104 and 106 are connected to a common conductor 112. As set forth in connection with apparatus 89 and 91, it is unimportant what character of impedance devices are used, so long as the phase angles thereof differ by 60°. In order to indicate the opposite phase-sequence component of the unbalanced voltages, it is only necessary to interchange the connections of the impedance devices with the respective transformer windings.

The circuit to the movable coil 87 includes secondary winding 104, resistor 107, secondary winding 106 and reactive impedance 111. The circuit to movable coil 88 comprises secondary winding 104 and associated reactive impedance 108, secondary winding 106 and associated resistor 109. With the described connections, coil 87 will be energized in accordance with the balanced positive-phase-sequence-voltage component, and coil 88 will be energized in accordance with the balanced negative-phase-sequence-voltage component. Thus, the Kelvin balance is energized in accordance with balanced components of the unbalanced watts of the supply circuit, so that the operation of the balance is the same as with the usual connections thereof.

Movable coils 87 and 88 are mounted upon a lever 113, which is pivoted at 114, and carries, at one end thereof, movable contact member 115.

Contact member 115 co-operates with stationary contact members 116 and 117. Contact member 116 is in circuit with the coil of electromagnetic device 81, which, when energized, closes the circuit to the pilot motor 71, to effect the rotation of the motor in a counter-clockwise direction. Contact member 117 is in circuit with the coil of electromagnetic switch 82, which, when energized, completes the circuit to the pilot motor 71 to effect rotation of the motor in a clockwise direction. Consequently, the pilot motor 71 will be rotated in the one direction or the other to correspondingly open or close the throttle valve 69 to control the operation of the prime mover 68, which will govern the energy delivered by the auxiliary generator 65 to the supply conductors 61, 62 and 63.

The rotation of the shaft 76 of the pilot motor 71 also adjusts the arm of the rheostat 77, which is in circuit with the coil of electromagnetic device 118, co-operating with the core armature of which is a dash-pot 119. Secured to the lever 113 of the Kelvin balance 79 is also a dash-pot 121. The dash-pots 119 and 121 are connected together by means of a tube 122. The function of the electromagnetic device 118 and the associated rheostat 77 is to apply a reactive force to the lever 113 to separate the contact member 115 from contact member 116 or member 117, as the case may be, just prior to the obtaining of normal load conditions upon the supply circuit.

From the foregoing description, it will be apparent that the load-regulator is energized in accordance with the total watts of the supply circuit comprising conductors 61, 62 and 63, by indicating in the regulating device the phase-sequence watts of the circuit.

Referring to Figs. 3 and 4, the principles of the present invention are illustrated as applied to a system of power-factor regulation, such system being illustrated and described in detail in a copending application of C. A. Boddie, filed Dec. 3, 1919, Serial No. 342,176, and assigned to the Westinghouse Elec. & Mfg. Co.

In general, this system comprises a main generator 127, connected to supply conductors 128, 129 and 130. The generator comprises an armature 131 and a field-magnet winding 132. The field-magnet winding has connected thereto an exciter machine 133, the field-magnet winding 134 of which has an adjustable rheostat 135 in circuit therewith. The effective value of rheostat 135 is controlled by an electromagnetic device 136, in acordance with the operation of regulating apparatus 137.

The regulating apparatus comprises a main control magnet 138, having two oppositely disposed and oppositely wound current coils 139 and 140 and a centrally located voltage coil 141, co-operating with a core member 142, as illustrated in detail in Fig. 4. The main control magnet is connected to a floating lever 143, carrying one of the contact members 144, which is pivoted to bell-crank lever 145. Connected to the free arm of the bell-crank lever 145 is an auxiliary control magnet 146 having a voltage coil 147 connected in parallel-circuit relation to the voltage coil 141.

The current coils 139 and 140 of the main control magnet 138 are adapted to be energized in accordance with the positive phase-sequence component of the currents of the unbalanced supply circuit, in accordance with the operation of the apparatus 148, which is similar in operation to the apparatus 32 of Fig. 1.

However, in order to obtain proper phase relation between current and voltage in the adaptation being described, it is desirable to locate the secondary windings of transformers 160 and 161 upon conductors 128 and 129, respectively, and to connect across the transformer 160, reactive impedance device 162 and across transformer 161, resistor 163. Accordingly, primary coil 149 of transformer 151 is traversed by a current proportional to the current traversing supply conductor 129, and primary coil 152 of transformer 151 is supplied with current proportional to, but out of phase with, the current traversing the supply conductor 129. Accordingly, the current transversing the secondary winding 153 of transformer 151, is traversed by a current proportional to the balanced positive-phase-sequence component of the unbalanced currents of the supply circuit, which, for unity-power-factor regulation, should be 90° displaced from the corresponding voltage component.

Voltage coils 147 and 141 are adapted to be supplied with a potential proportional to the positive-phase-sequence component of the unbalanced voltages of the supply circuit, through apparatus 154, which is similar in all respects to apparatus 31, illustrated and described in Fig. 1. Accordingly, the secondary winding 155 of transformer device 156, is traversed by a current proportional to the desired component of the unbalanced voltages, and is directly connected to the voltage coils 141 and 147.

In order to prevent a hunting action in the operation of the regulator, the coil 147 of the auxiliary control magnet 146 has included in circuit therewith an adjustable resistor 157 which is adapted to be shunted by the operation of electromagnetic device 158. The device 158 is controlled by the main contact members, in a manner well known in this type of regulator.

From Figs. 3 and 4, it will be noted that the current and the potential windings are so located upon the core armature 142 of the main control magnet that the magnet cannot be operated by either the current or the potential windings alone. However, the potential winding 141 acts as a polarizing coil. Hence, if a power-factor below the predetermined value obtains upon the supply circuit, a wattless current flows through the current windings 139 and 140, which has such a vector relation to the current flowing through the potential winding 141 as to effect operation of the main control magnet 138. This will cause the main control magnet 138 to effect engagement of the contact members 144 to operate the relays 136 and 158, respectively, in the customary manner, to effect power-factor correction.

While I have illustrated the principles of the present invention, as applied to certain well-known types of induction, load, and power-factor regulators, it will be apparent to those skilled in the art that the principles of the present invention may be applied to other regulator systems with equal force and effect. Hence, modifications made in the system and in the arrangement and location of parts are within the spirit and scope of my invention, and are intended to be covered by the appended claims.

I claim as my invention:—

1. In a control system for an induction regulator, the combination with a control motor for said regulator, contact-making means for governing the operation of said motor, and means cooperating therewith for compensating for line-circuit conditions, of actuating means for said contact-making means and means for energizing said actuating means in accordance with one of a set of symmetrical components into which the unbalanced electrical quantities of said circuit may be resolved.

2. In a control system for an induction regulator, the combination with a control motor for said regulator, contact-making means for governing the operation of said motor, actuating means for said contact-making means, and means in circuit therewith for compensating for line-circuit conditions, and means for energizing said actuating means in accordance with the positive-phase-sequence component of the unbalanced electrical quantities of said circuit.

In testimony whereof, I have hereunto subscribed my name this 4th day of April, 1921.

ROBERT D. EVANS.